United States Patent
Huang

(10) Patent No.: US 9,734,142 B2
(45) Date of Patent: Aug. 15, 2017

(54) UNIVERSAL TRANSLATION

(71) Applicant: Facebook, Inc., Menlo Park, CA (US)

(72) Inventor: Fei Huang, Boonton, NJ (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/861,747

(22) Filed: Sep. 22, 2015

(65) Prior Publication Data

US 2017/0083504 A1    Mar. 23, 2017

(51) Int. Cl.
| | |
|---|---|
| G06F 17/21 | (2006.01) |
| G06F 17/27 | (2006.01) |
| G06F 17/28 | (2006.01) |
| G06F 17/24 | (2006.01) |
| G06F 17/20 | (2006.01) |

(52) U.S. Cl.
CPC .......... *G06F 17/275* (2013.01); *G06F 17/218* (2013.01); *G06F 17/27* (2013.01); *G06F 17/28* (2013.01); *G06F 17/289* (2013.01); *G06F 17/20* (2013.01); *G06F 17/21* (2013.01); *G06F 17/24* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,293,584 A | * | 3/1994 | Brown | G10L 15/18 |
| | | | | 704/200 |
| 5,477,451 A | * | 12/1995 | Brown | G06F 17/2755 |
| | | | | 704/2 |
| 5,510,981 A | * | 4/1996 | Berger | G06F 17/2827 |
| | | | | 704/2 |
| 5,991,710 A | * | 11/1999 | Papineni | G06F 17/2818 |
| | | | | 704/2 |
| 6,002,998 A | * | 12/1999 | Martino | G06F 17/275 |
| | | | | 704/1 |
| 6,157,905 A | * | 12/2000 | Powell | G06F 17/2217 |
| | | | | 704/2 |

(Continued)

OTHER PUBLICATIONS

International Search Report and Written Opinion for International Application No. PCT/US2015/051737, Mail Date Jul. 28, 2016, 22 pages.

(Continued)

*Primary Examiner* — Pierre-Louis Desir
*Assistant Examiner* — David Kovacek
(74) *Attorney, Agent, or Firm* — Perkins Coie LLP

(57) ABSTRACT

A likely source language of a media item can be identified by attempting an initial language identification of the media item based on intrinsic or extrinsic factors, such as words in the media item and languages known by the media item author. This initial identification can generate a list of most likely source languages with corresponding likelihood factors. Translations can then be performed presuming each of the most likely source languages. The translations can be performed for multiple output languages. Each resulting translation can receive a corresponding score based on a number of factors. The scores can be combined where they have a common source language. These combined scores can be used to weight the previously identified likelihood factors for the source languages of the media item.

20 Claims, 7 Drawing Sheets

(56) References Cited

U.S. PATENT DOCUMENTS

| | | | |
|---|---|---|---|
| 6,223,150 B1* | 4/2001 | Duan | G10L 15/26 704/277 |
| 6,266,642 B1* | 7/2001 | Franz | G06F 17/271 704/257 |
| 6,304,841 B1* | 10/2001 | Berger | G06F 17/277 704/2 |
| 6,393,389 B1* | 5/2002 | Chanod | G06F 17/271 704/4 |
| 7,827,026 B2* | 11/2010 | Brun | G06F 17/289 704/2 |
| 8,756,050 B1* | 6/2014 | Harkness | G06F 17/2854 704/1 |
| 8,838,434 B1* | 9/2014 | Liu | G06F 17/289 704/2 |
| 8,935,150 B2* | 1/2015 | Christ | G06F 17/276 704/2 |
| 8,942,973 B2* | 1/2015 | Viswanathan | G06F 17/277 704/277 |
| 9,104,661 B1* | 8/2015 | Evans | G06F 17/28 |
| 2002/0087301 A1* | 7/2002 | Jones | G06F 17/2872 704/2 |
| 2002/0169592 A1* | 11/2002 | Aityan | G06F 17/289 704/2 |
| 2003/0040900 A1* | 2/2003 | D'Agostini | G06F 17/2836 704/2 |
| 2004/0002848 A1* | 1/2004 | Zhou | G06F 17/2827 704/2 |
| 2004/0098247 A1* | 5/2004 | Moore | G06F 17/2827 704/4 |
| 2004/0122656 A1* | 6/2004 | Abir | G06F 17/2872 704/4 |
| 2004/0243392 A1* | 12/2004 | Chino | G06F 17/27 704/7 |
| 2005/0021323 A1* | 1/2005 | Li | G06F 17/2735 704/5 |
| 2005/0055630 A1* | 3/2005 | Scanlan | G06F 17/289 715/234 |
| 2005/0228640 A1* | 10/2005 | Aue | G06F 17/2881 704/9 |
| 2006/0111891 A1* | 5/2006 | Menezes | G06F 17/2818 704/3 |
| 2006/0206798 A1* | 9/2006 | Kohlmeier | G06F 8/38 715/201 |
| 2006/0271352 A1* | 11/2006 | Nikitin | G06F 17/289 704/9 |
| 2007/0130563 A1* | 6/2007 | Elgazzar | G06F 17/289 717/137 |
| 2008/0077384 A1* | 3/2008 | Agapi | G06F 9/4448 704/2 |
| 2008/0281578 A1* | 11/2008 | Kumaran | G06F 17/28 704/2 |
| 2009/0083023 A1* | 3/2009 | Foster | G06F 17/2827 704/3 |
| 2009/0132233 A1* | 5/2009 | Etzioni | G06F 17/28 704/3 |
| 2009/0182547 A1* | 7/2009 | Niu | G06F 17/2827 704/2 |
| 2009/0198487 A1* | 8/2009 | Wong | G06F 17/28 704/4 |
| 2009/0210214 A1* | 8/2009 | Qian | G06F 17/289 704/2 |
| 2009/0276206 A1* | 11/2009 | Fitzpatrick | G06F 17/28 704/2 |
| 2009/0281789 A1* | 11/2009 | Waibel | G06F 17/2735 704/3 |
| 2009/0326912 A1* | 12/2009 | Ueffing | G06F 17/2818 704/2 |
| 2010/0223048 A1* | 9/2010 | Lauder | G06F 17/2836 704/4 |
| 2011/0099000 A1* | 4/2011 | Rai | G06F 17/2223 704/2 |
| 2011/0137636 A1 | 6/2011 | Srihari et al. | |
| 2012/0047172 A1* | 2/2012 | Ponte | G06F 17/3061 707/776 |
| 2012/0123765 A1* | 5/2012 | Estelle | G06F 17/2818 704/3 |
| 2012/0158621 A1 | 6/2012 | Bennett et al. | |
| 2012/0173224 A1* | 7/2012 | Anisimovich | G06F 17/2755 704/2 |
| 2012/0209588 A1* | 8/2012 | Wu | G06F 17/289 704/3 |
| 2012/0253785 A1* | 10/2012 | Hamid | G06F 17/2229 704/4 |
| 2012/0330643 A1* | 12/2012 | Frei | G06F 17/289 704/2 |
| 2013/0018650 A1* | 1/2013 | Moore | G06F 17/2818 704/9 |
| 2013/0084976 A1* | 4/2013 | Kumaran | G06F 17/2845 463/30 |
| 2013/0103384 A1* | 4/2013 | Hunter | G06F 17/28 704/3 |
| 2013/0173247 A1* | 7/2013 | Hodson | G06F 17/2827 704/4 |
| 2014/0081619 A1* | 3/2014 | Solntseva | G06F 17/289 704/3 |
| 2014/0195884 A1* | 7/2014 | Castelli | G06F 17/278 715/201 |
| 2014/0207439 A1* | 7/2014 | Venkatapathy | G06F 17/2836 704/4 |
| 2014/0288917 A1* | 9/2014 | Orsini | G06F 17/2854 704/2 |
| 2014/0288918 A1* | 9/2014 | Orsini | G06F 17/289 704/2 |
| 2014/0335483 A1 | 11/2014 | Buryak et al. | |
| 2014/0337989 A1* | 11/2014 | Orsini | H04L 51/12 726/26 |
| 2014/0350916 A1* | 11/2014 | Swerdlow | G06F 17/2705 704/2 |
| 2014/0358519 A1* | 12/2014 | Mirkin | G06F 17/2854 704/3 |
| 2014/0365200 A1* | 12/2014 | Sagie | G06F 17/289 704/2 |
| 2015/0033116 A1* | 1/2015 | McKinney | G06F 17/2247 715/239 |
| 2015/0134322 A1* | 5/2015 | Cuthbert | G06F 17/289 704/3 |
| 2015/0142420 A1* | 5/2015 | Sarikaya | G06F 17/279 704/9 |
| 2015/0161115 A1* | 6/2015 | Cuthbert | G06F 17/2836 704/2 |
| 2016/0048505 A1* | 2/2016 | Cuthbert | G06F 17/275 704/2 |
| 2016/0117628 A1* | 4/2016 | Brophy | G06F 17/2854 704/2 |
| 2016/0162473 A1* | 6/2016 | Cogley | G06F 17/28 704/9 |
| 2016/0162575 A1* | 6/2016 | Eck | G06F 17/2827 707/776 |
| 2016/0357519 A1* | 12/2016 | Vargas | G10L 15/265 |
| 2017/0169015 A1 | 6/2017 | Huang | |
| 2017/0177564 A1 | 6/2017 | Rottmann et al. | |

OTHER PUBLICATIONS

Final Office Action dated Jun. 16, 2017, for U.S. Appl. No. 14/586,022 of Huang, F. et al., filed Dec. 30, 2014.

Notice of Allowance dated Jun. 6, 2017, for U.S. Appl. No. 14/981,794 by Rottman, K., et al., filed Dec. 28, 2015.

Non-Final Office Action dated Jun. 26, 2017, for U.S. Appl. No. 15/445,978 of Herdagdelen, A., filed Feb. 28, 2017.

* cited by examiner

UNIVERSAL TRANSLATION

BACKGROUND

The Internet has made it possible for people to connect and share information globally in ways previously undreamt of. Social media platforms, for example, have enabled people on opposite sides of the globe to collaborate on ideas, discuss current events, or share what they had for lunch. In the past, this spectacular resource has been somewhat limited to communications between users having a common natural language ("language"). In addition, users have only been able to consume content that is in their language, or for which a content provider is able to determine an appropriate translation based on a system setting or a network location (e.g., an Internet Protocol ("IP") address or language identifier).

While communication across the many different languages used around the world remains a particular challenge, machine translation services have attempted to address this concern. These services provide mechanisms for a user to provide a text using a web form, select one or more languages, and receive a translation of the text in a selected language. While these services have significantly increased people's ability to communicate across language barriers, they can require users to open a separate website, indicate the language they want the translation in, and identify the language of the source document. The resulting translation is then shown in that separate website, which removes the content from the context provided by the original source. In some cases the translator service may not be able to locate portions of the source page to translate or may provide an unreadable version of the source website due to formatting changes resulting from the translation. In many cases, users find this process too cumbersome and may lose patience and navigate to a different website or may simply skip over text they do not understand, missing an opportunity to receive content.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
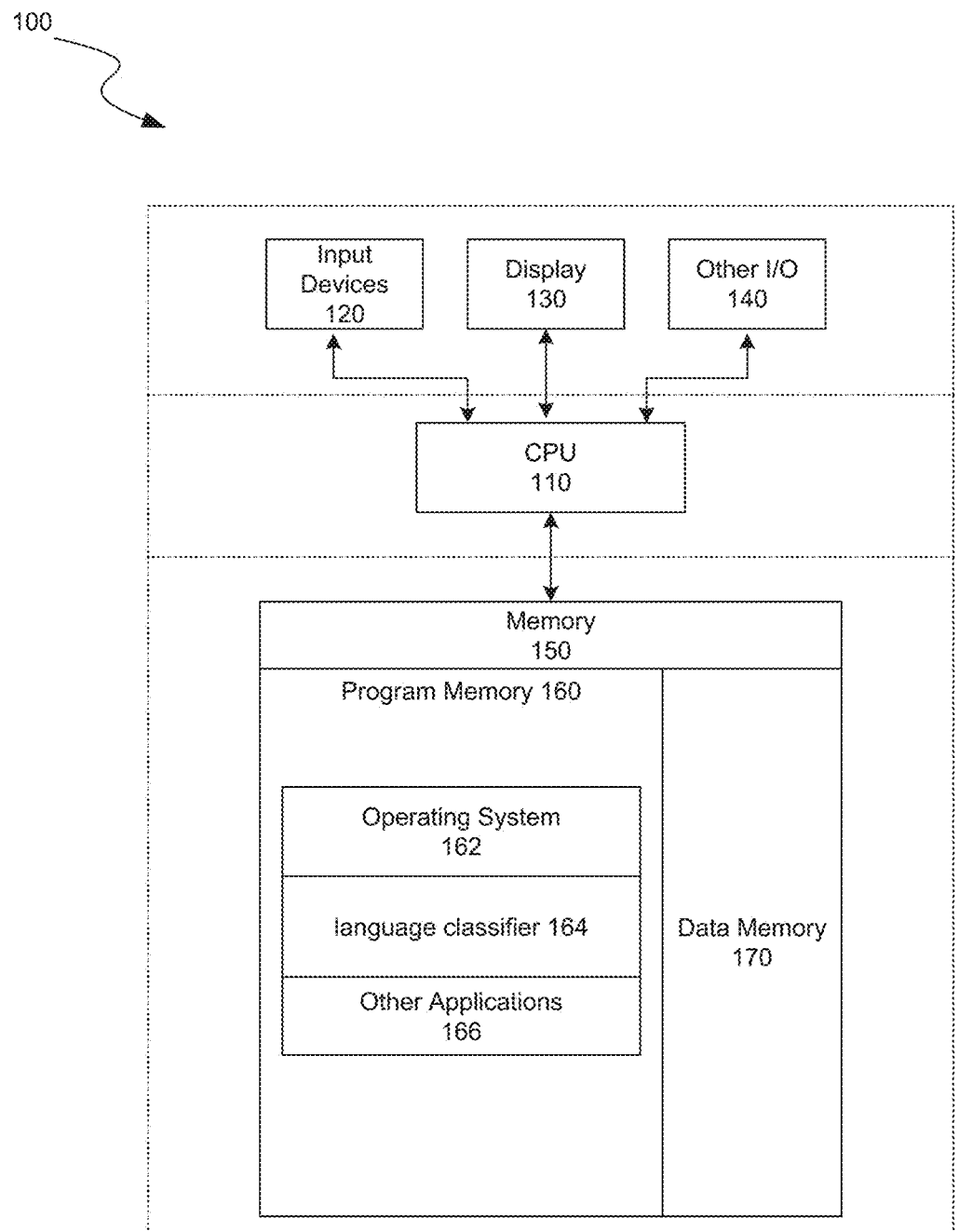
FIG. 1 is a block diagram illustrating an overview of devices on which some implementations of the disclosed technology can operate.

Various embodiments of the present disclosure may include methods, computer-readable storage media and systems for identifying a most likely source language of a snippet. An indication of the snippet may be received. Two or more possible source languages for the snippet may be determined. Two or more translations of the snippet may be generated, each having a specified translation source language. At least one of the two or more translations of the snippet may be generated having a first of the two or more possible source languages for the snippet set as the specified translation source language, and at least another of the two or more translations of the snippet may be generated having a second of the two or more possible source languages for the snippet other than the first the two or more possible source languages for the snippet set as the specified translation source language. Accuracy scores for at least two of the generated two or more translations of the snippet may be computed. A confidence factor for each of at least two selected possible source languages for the snippet may be produced, wherein the confidence factor for each selected possible source language may be produced based on one or more of the computed accuracy scores that has a source language corresponding to the selected a possible source language. The possible source language for the snippet that is associated with a highest confidence factor may be selected as the most likely source language.

In an embodiment, one or more computer-readable non-transitory storage media embody software that is operable when executed to perform a method according to the invention or any of its embodiments.

In an embodiment, a system comprises one or more processors and at least one memory, coupled to the processors and comprising instructions executable by the processors, the processors operable when executing the instructions to perform a method according to the invention or any of its embodiments.

In an embodiment, a computer program product, preferably comprising a computer-readable non-transitory storage medium, is operable when executed on a data processing system, to perform a method according to the invention or any of its embodiments.

Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Source language identification based on scoring multiple language translations is disclosed. When performing language processing on a media item, such as applying a machine translation engine, performing spelling corrections or grammar corrections, the source language of the media item can be provided as a parameter for the processing engine. Identifying the source language of a media item can be difficult, particularly where the linguistic content of the media item is short, uses slang or other words unaffiliated with a particular language, has unidentified portions, or contains errors.

Source language identification of a media item can be accomplished by performing an initial analysis of the media item based on factors such as its content and context. This initial analysis can identify one or more likely source languages and corresponding confidence scores. Multiple translations of the media item can then be performed using a machine translation engine to convert the media item, for each top scoring source language, into multiple output languages. A score can be computed for each translation indicating the quality of that translation. The set of scores that correspond to each source language can be combined to form a weighting factor corresponding to that source language. These weighting factors can then be used to adjust the confidence scores corresponding to each source language. The source language with the highest adjusted score can be selected as the most likely source language.

A "source language," as used herein, refers to a natural language in which a media item was written in or which it currently exists. A "media item," as used herein, can be any content that utilizes a language, including text, audio, video, etc. A "language," as used herein, is a natural language, which is a human written, spoken, or signed language, e.g., English, French, Chinese, or American Sign Language. A language need not be a national language, e.g., English, but can be a dialect of or variation on a particular natural language or can be a separate representation of a language, e.g., Pinyin.

As an example, a media item that is a social media post about the San Diego Padres may containing the snippet: "Mi Padres r playing on television." An initial analysis of this snippet using an algorithm that only matches words to corresponding languages may indicate English with a score of 0.87 and Spanish with as score of 0.91 as the top two scoring source languages because: "mi" means "my" in Spanish but could be a typo of "my" in English; "Padres" means "fathers" in Spanish but is commonly used in English when referring to the Padres sports team, particularly when capitalized in the middle of a sentence; "r" may not be mapped to any language or may be weakly indicative of English as it is common slang to substitute "r" for "are;" "on" may indicate English; and "television" may be ambiguous between English and Spanish as, without accents, the spelling is the same in both languages.

Continuing this example, multiple translations of the snippet can then be performed using a machine translation engine. A first set of translations can be performed converting the snippet into multiple output languages, setting the source language as English. A second set of translations can be performed converting the snippet into multiple output languages, setting the source language as Spanish. Each of the resulting translations in the first set can be scored, and these scores can be combined into an English weighting factor, which in this example is 1.12. Each of the resulting translations in the second set can also be scored, and these scores can be combined into a Spanish weighting factor, which in this example is 0.80. The English weighting factor can be applied to the English confidence score by multiplying them, to receive an updated English confidence factor of 0.97. The Spanish weighting factor can be applied to the Spanish confidence score by multiplying them, to receive an updated Spanish confidence factor of 0.73. Based on the updated confidence factors, English can be determined to be the most likely source language.

Several implementations of the described technology are discussed below in more detail in reference to the figures. Turning now to the figures, FIG. 1 is a block diagram illustrating an overview of devices 100 on which some implementations of the disclosed technology may operate. The devices can comprise hardware components of a device 100 that can identify a media item source language based on multiple translations. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 has access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, language classifier 164, and any other application programs 166. Memory 150 can also include data memory 170 that can include media items; media item translations and translation engines; translation scores, combined translation scores, and scoring models; media item to source language mappings or confidence scores; configuration data; settings; and user options or preferences which can be provided to the program memory 160 or any element of the device 100.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, and the like.

Figure 2:
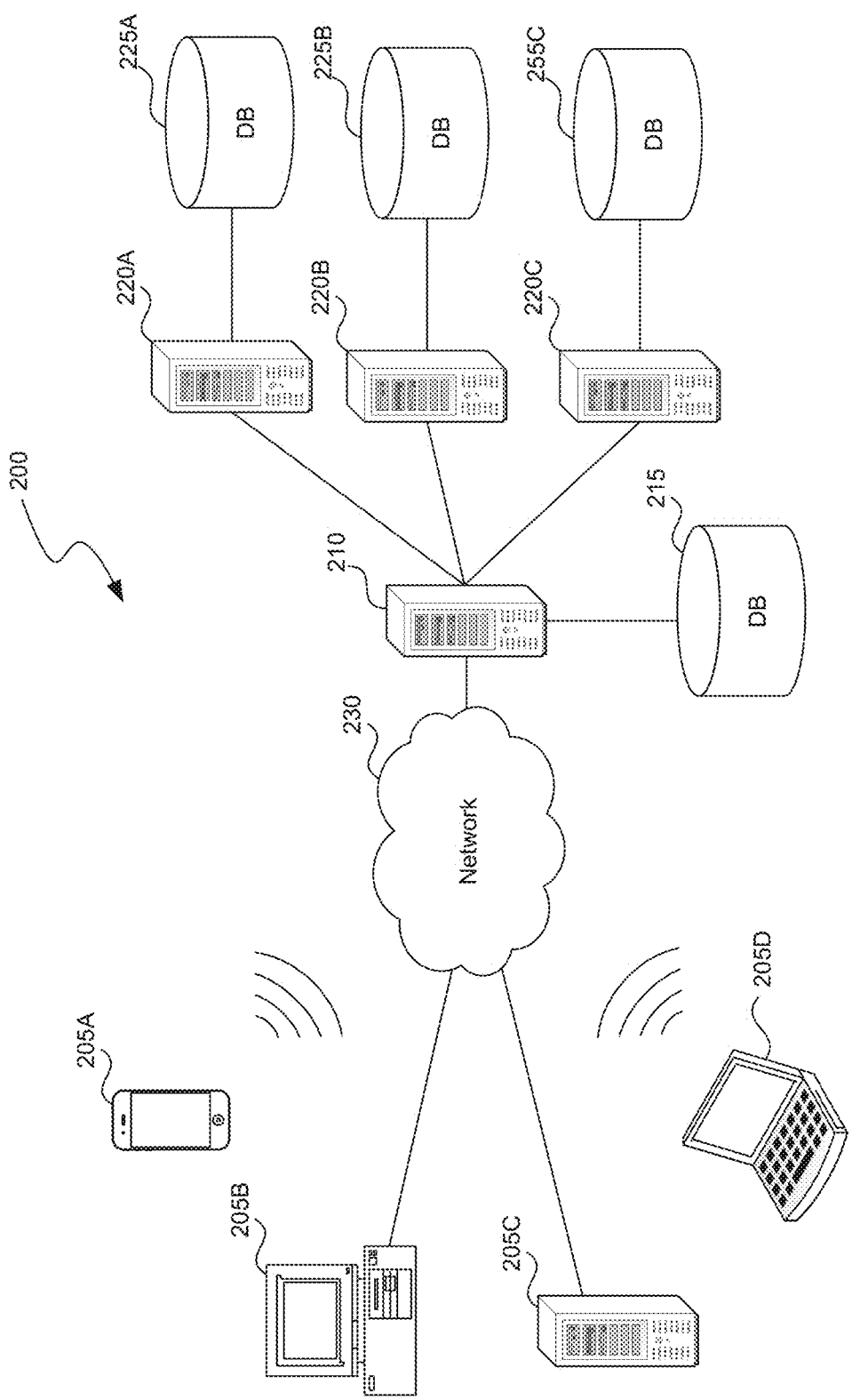
FIG. 2 is a block diagram illustrating an overview of an environment in which some implementations of the disclosed technology can operate.

FIG. 2 is a block diagram illustrating an overview of an environment 200 in which some implementations of the disclosed technology may operate. Environment 200 can include one or more client computing devices 205A-D, examples of which may include device 100. Client computing devices 205 can operate in a networked environment using logical connections 210 through network 230 to one or more remote computers such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 may correspond to a group of servers, and each of these servers can share a database or can have their own database. Databases 215 and 225 can warehouse (e.g. store) information such as media items; media item translations and translation engines; translation scores, combined translation scores, and scoring models; or media item-to-source language mappings or confidence scores. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. The client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

A "language snippet" or "snippet," as used herein, is a digital representation of one or more words or character groups. A snippet can be a representation of a media items or language from a media item. While the description below refers to snippets when performing source language classification on media items, other language formats can be used such as audio or video language representations.

Figure 3:
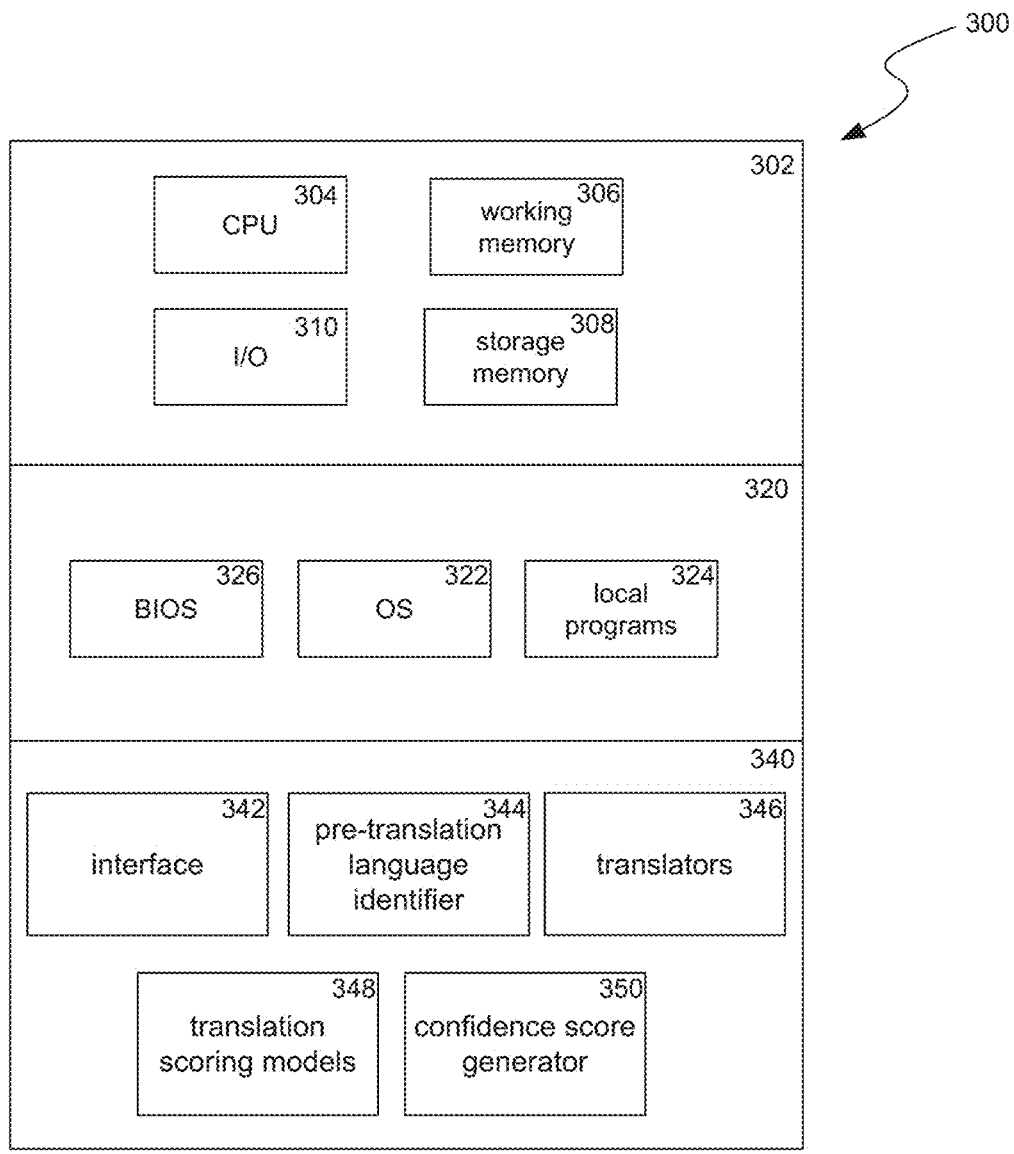
FIG. 3 is a block diagram illustrating components which, in some implementations, can be used in a system employing the disclosed technology.

FIG. 3 is a block diagram illustrating components 300 which, in some implementations, can be used in a system implementing the disclosed technology. The components 300 include hardware 302, general software 320, and specialized components 340. As discussed above, a system implementing the disclosed technology can use various hardware including central processing units 304, working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a BIOS 326. Specialized components 340 can be subcomponents of a general software application 320, such as local programs 324. Specialized components 340 can include pre-translation language identifier 344, translators 346, translation scoring models 348, confidence score generator 350, and components which can be used for controlling and receiving data from the specialized components, such as interface 342. In some implementations, components 300 can be in a computing system that is distributed across multiple computing devices or can include an interface to a server-based application.

Pre-translation language identifier 344 can be configured to perform an initial source language classification of a snippet, such as a snippet received through interface 342. This initial source language classification can identify one or more languages of a snippet with a corresponding confidence value. The identified languages can be sorted based on their confidence value and languages with a confidence value above a threshold level can be selected for further analysis. For example, the threshold level can be 1, 3, 5, or 10 potential source languages; the top 1, 3, 5, 10, 25 or 50% potential source languages; all potential source languages with a confidence value above 50%, 60%, 75%, 80%, or 90%; or all the potential source languages can be selected for further analysis. Initial source language classification can be based on an analysis of the content of a snippet, such as which words are used, the structure and grammar in the snippet, the slang terms used, punctuation, etc. Initial source language classification can also be based on an analysis of the context of a snippet, such as who the author is and what is known about them and who their friends are, when the snippet was created, where the snippet was posted and what other information is available about the other items in that location, etc. Examples of classifying media items in this manner is discussed in further detail in U.S. patent application Ser. No. 14/302,032, incorporated herein by reference.

Translators 346 can be one or more machine translation engines. Machine translation generation engines can be programs that take a snippet as input and generate a version of the snippet in another language or dialect. In some implementations, one of the translators 346 can be setup to perform a translation for a particular source language, output language, or both. In some implementations a translator 346 can be a setup to perform translations from multiple source languages or to multiple output languages as defined by a parameter provided to the translator. Translators 346 can use various language models, sets of rules, or other algorithms to perform the conversion of a snippet from a source language to an output language. The translators for various source/output languages or source/output language parameters can be selected for further analysis by pre-translation language identifier 344 based on languages with a confidence value above a threshold level.

Translation scoring models 348 can receive translations from translators 346 and can be configured to provide an estimation of the quality of the translations. In some implementations, translation scoring models 348 can be one or more trained models, such as neural networks, that can provide a score for a translation. In some implementations, one of the translation scoring models 348 can be set up to perform an analysis of a translation for a particular source language, output language, or both. In some implementations, one of the translation scoring models 348 can be set up to perform an analysis of multiple source languages or to multiple output languages. Translation scoring models 348 can provide a score for each translation. In some implementations, translators 346 can be selected or configured to create multiple translations of the snippet applying the same source language and multiple different output languages. In these cases, a combined score for the source language can be created, such as by averaging the various scores for translations that share a source language. The scores can be configured to be a weighting factor for the confidence scores generated by pre-translation language identifier 344. For example, a score of 1 would be a neutral score, a score of 0.9 would decrease the confidence value by 10% and a score of 1.1 would increase the confidence value by 10%.

Confidence score generator 350 can receive the weighting factors from translation scoring models 348 and the confidence values for identified possible source languages from pre-translation language identifier 344. Confidence score generator 350 can then use the weighting factors to update the confidence values of the identified possible source languages. The resulting identified possible source language that has the highest updated confidence value can be selected as the most likely source language for the snippet. This identification can be returned through interface 342.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc.

Figure 4:
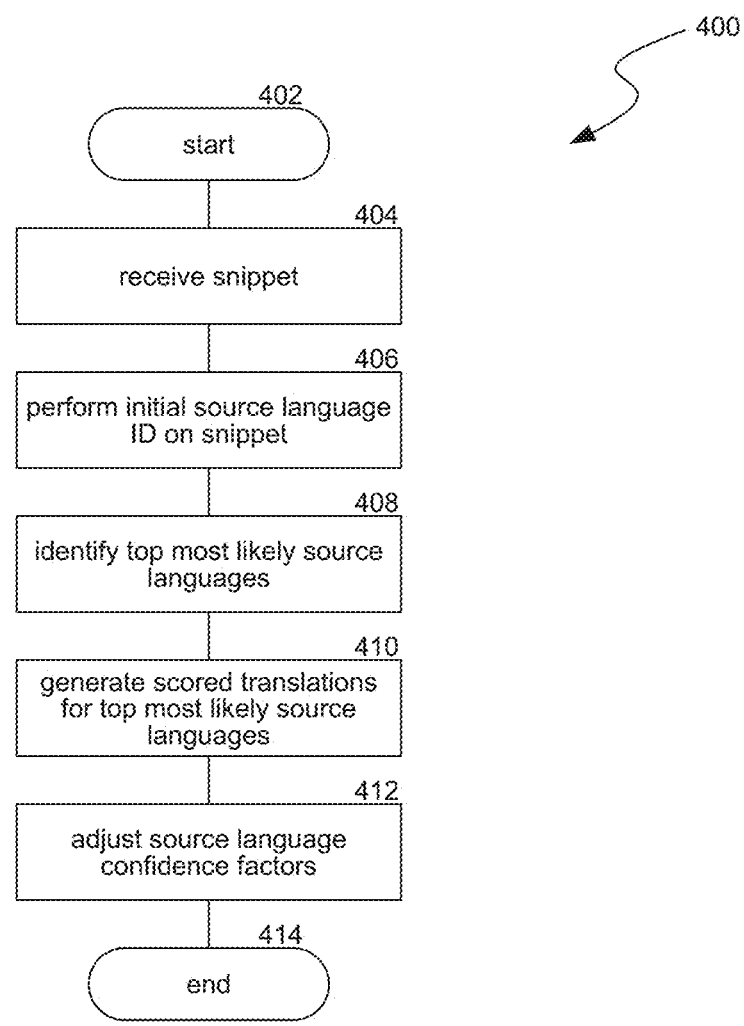
FIG. 4 is a flow diagram illustrating a process used in some implementations for computing confidence scores for snippet source languages.

FIG. 4 is a flow diagram illustrating a process 400 used in some implementations for computing confidence scores for snippet source languages. Process 400 begins at block 402 and continues to block 404. At block 404, process 400 can receive a snippet for which a source language is to be determined. In various implementations, snippets can be selected for process 400 based on an identified source language for the snippet having a low confidence value or an indication that the snippet is important or may have a large readership, such as where the author is a celebrity or is someone who creates snippets that are typically seen/shared by many people, where the topic of the snippet is about a popular issue which attracts many people's attention, or where a snippet has had lots of engagement in a short time after its creation.

At block 406, process 400 can perform an initial source language identification on the snippet received at block 404. Performing initial source language identification of the snippet can comprise analyzing the content and/or context of the snippet. Analyzing the content of the snippet can include determining which words in the snippet matchup to which languages; whether the grammar in the snippet is indicative of a particular language; whether the structure of the language in the snippet is indicative of a particular language; whether punctuation such as accent marks are used; what type of characters are used; etc. Analyzing the context of the snippet can include determining whether the time a snippet was created is indicative of a particular language or region; determining whether the virtual location a snippet is posted to, or other media items at that location, are indicative of a particular language; or whether information available about the author of the snippet is indicative of a particular language. For example, a snippet is likely to be written in a language known by its author or friends of the author. Additional details about performing initial source language identification can be found in U.S. patent application Ser. No. 14/302,032. In some implementations, the identifications of initial source languages can include confidence values. The confidence values can be based on the type or factors from the content or context analysis that yielded a source language identification or how strongly one of more factors indicates a particular language.

At block 408, one or more top most likely source languages can be identified. This can be accomplished, for example, by selecting potential source languages that have a confidence value above a threshold. In some implementations, selecting the top most likely source languages can include selecting all potential source languages.

At block 410, process 400 can generate scored translations for the top most likely source languages determined at block 408. Generating scored translations can include applying, to the snippet, translators configured for different source or output languages; applying scoring models to the resulting translations; and, where multiple translations are created for the same source language, combining scores for translations with the same source language. Additional details regarding generating scored translations are discussed below in relation to features 5A and 5B. In some implementations, blocks 406 and 408 can be skipped or only a simplified most likely language analysis can be performed. If blocks 406 and 408 are skipped, block 410 can be performed for all possible source languages or for a specified set of common source languages.

At block 412, process 400 can adjust the confidence factors for one or more of the possible source languages identified at block 406. In some implementations, the scores from block 410 can be weighting factors. In some implementations adjusting the confidence values can include multiplying the weighting factors from block 410 with the confidence values determined in block 406. In some implementations, the scores determined at block 410 corresponding to particular source languages can be used as the updated confidence values by replacing the values determined at block 406. The potential source language with the highest adjusted confidence value can be selected as the most likely source language for the received snippet. An identification of this most likely source language or one or more of the translations corresponding to this most likely source language can be returned. Process 400 continues to block 414, where it ends.

Figure 5A:
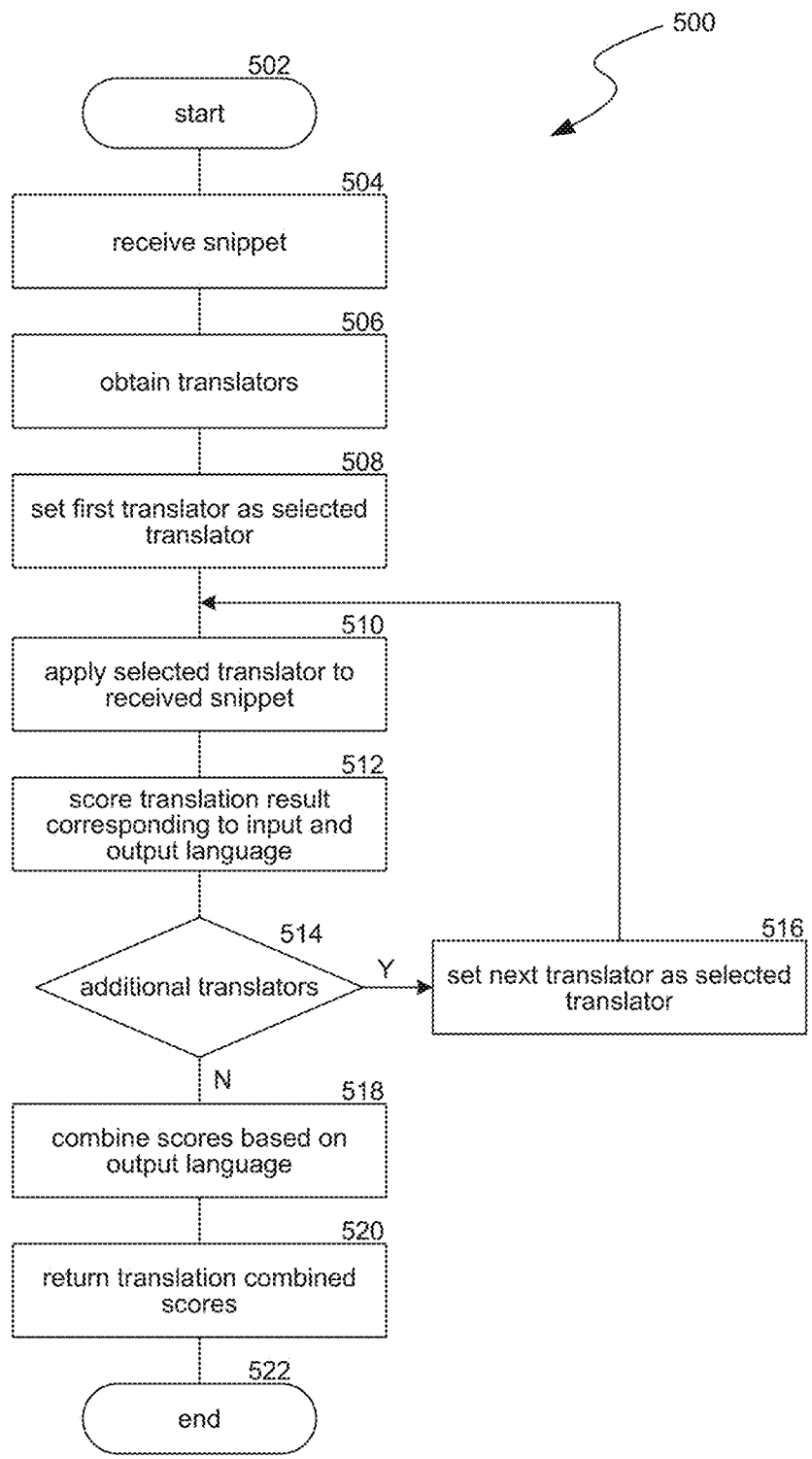
FIG. 5A is a flow diagram illustrating one process used in some implementations for generating scored translations of a snippet.

FIG. 5A is a flow diagram illustrating a process 500 used in some implementations for generating scored translations of a snippet. As discussed below, in some implementations, process 500 can create translations with different output languages for each of multiple potential source languages. This can be a computationally intensive procedure, and therefore it may be performed "offline" such as at the time of creation of a post to a social media site, before the post has been selected to be displayed. Process 500 begins at block 502 and continues to block 504. At block 504, process 500 can receive a snippet. In some implementations, the snippet can be the one received by process 400 at block 404.

At block 506, process 500 can obtain one or more translators. In some implementations, the obtained translators can be one or more machine translation engines. While translators are discussed below as being individually configured for a particular source or output language, in some implementations, the same translator can be used for multiple source or output language by setting parameters for which source or output language will be applied. In various implementations, the translators may be configured for a particular output languages or may be configured for multiple output languages. In some implementations, the obtained translators can correspond to source languages that have been determined to be a likely source language for the received snippet, such as may be determined by the process at block 406.

At block 508, the first obtained translator is set as a selected translator. At block 510, the selected translator, which presumes a particular source language generates a particular output language, can be applied to the received snippet, creating a translation of the snippet. At block 512, process 510 can compute a score for the translation created at block 510. In some implementations, models can compute the confidence score of a translation given the source and output languages. In some implementations, scoring models can be trained constructs, such as neural networks, or can use other analysis techniques such as grammar analysis and decision trees.

At block 514, process 500 can determine whether any of the translators obtained at block 506 have not been applied to the received snippet. If so, process 500 continues to block 516. If not, process 500 continues to block 518. At block 516, process 500 sets the next unused translator, from the translators received at block 506, as selected translator. The loop between blocks 510 through 516 will continue until a scored translation has been obtained corresponding to each of the translators detained at block 506.

At block 518, if there are multiple translations with the same source language but different output languages, the scores for translations with the same source language can be combined, such as by averaging them. At block 520, the combined scores computed at block 518 or scores computed at block 512 can be returned. In some implementations, the corresponding translations can also be returned. Process 500 then continues to block 522, where it ends.

Figure 5B:
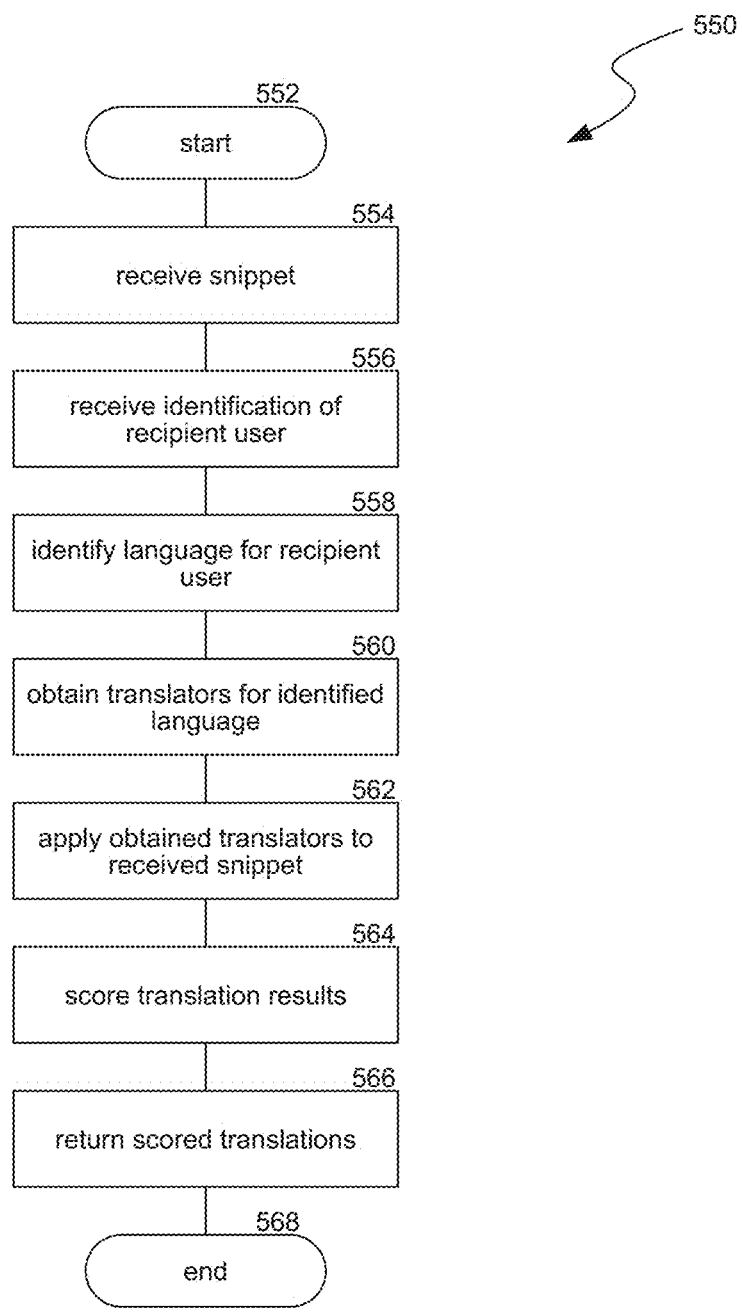
FIG. 5B is a flow diagram illustrating a process used in some additional implementations for generating scored translations of a snippet.

FIG. 5B is a flow diagram illustrating process 550 used in some additional implementations for generating scored translations of a snippet. Process 550 can be less computationally expensive than process 500. Thus, process 558 can be used when timeliness is essential, such as after a request for the snippet has been made. Process 550 begins at block 552 and continues to block 554. At block 554, process 550 can receive a snippet. In some implementations, the received snippet can be one that was received at block 404.

At block 556, an identification of a user who requested content containing the snippet can be received. At block 558, a language associated with the user identified block 556 can be identified. Identifying a language associated with a user can be based on factors such as setting specified for the user, e.g. browser settings or profile settings; a history of languages associated with content items created by the user; content items the user tends to interact with; languages associated with friends of the user; etc. Additional details about identifying a language associated with a user can be found in U.S. patent application Ser. No. 14/302,032.

At block 560, process 550 can obtain translators, e.g. machine translation engines, that generate translations for various source languages into an output language corresponding to the language identified at block 558. In some implementations, the obtained translators can be limited to those that specify a source language corresponding to one of the top most likely source languages identified at block 408.

At block 562, the translators obtained at block 560 can be applied to the snippet received at block 552 to obtain one or more translations of the received snippet. Each applied translator can presume a particular source language and can generate a translation in the language identified at block 558. At block 564, process 550 can score the translations created at block 562. As discussed above in relation to block 512, scoring translation results can comprise applying a scoring model. Scoring models can take a translation and a source snippet and compute a quality score for the translation, which can be based on parameters such as the specified source or output language.

At block 566, process 550 can return the translation scores. In some implementations, process 550 can also return the corresponding translations. Process 550 then continues to block 568, where it ends.

Figure 6:
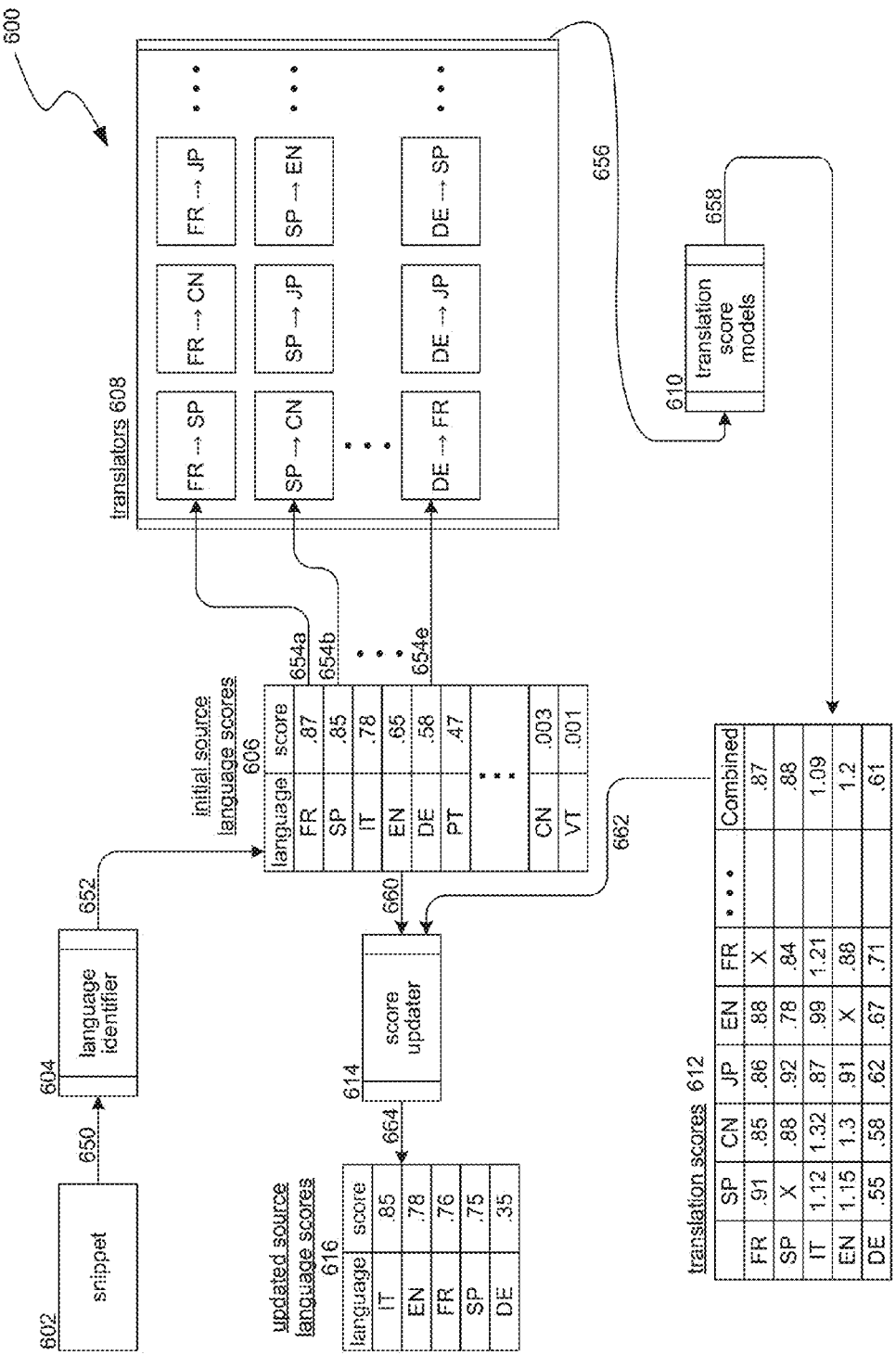
FIG. 6 is an example illustrating computing confidence scores for snippet source languages.

FIG. 6 is an example 600 illustrating computing confidence scores for possible source languages of a snippet. Example 600 includes a snippet 602, a language identifier 604, initial source language scores 606, translators 608, translation scoring models 610, translation scores 612, score updater 614, and updated source language scores 616. Snippet 602 can correspond to the snippet discussed above in relation to block 404. Language identifier 604 can correspond to the pre-translation language identifier discussed above in relation to block 344. Translators 608 can correspond to the translators discussed above in relation to block 346. Translation scoring models 610 can correspond to the translation scoring models discussed above in relation to block 348. Score updater 614 can correspond to the confidence score generator discussed above in relation to block 350.

In example 600, a snippet is provided to language identifier 604 at step 650. In this example, the snippet comprises "Check it: sto imparando un nouveau langua!" This snippet has features of several languages: "Check it" (English); sto imparando (Italian); un (French, Italian, or Spanish misspelling); nouveau (French); langua (close misspelling in any of French, Italian, or Spanish). Also, this snippet was posted to a comments section on a social media website for an article written in French, by a user known to generally speak Spanish, but who has many French speaking friends, and was posted from an IP address associated with a location in the United States that has mostly English speakers. At step 652 of example 600, language identifier 604 can identify initial source language scores 606. Identifying initial source language scores 606 at step 652 can correspond to block 406. In example 600, based on the above factors, French is the top scoring most likely source language, with Spanish a close second, and Italian also having a likelihood above 75%.

In example 600, this snippet is selected for further analysis because of the closeness of the top scoring possible source languages and because the author is a celebrity that has a history of having her posts to the social media site viewed by many other users. Thus, at step 654a-654e, the snippet is provided to translators 608 to have multiple translations of the snippet performed, each using a different combination of source language and output language. In example 600, a threshold initial confidence factor of 50% is set, so translations are performed for potential source languages: French, Spanish, Italian, English, and German, as these are the possible source languages in example 600 that have an initial confidence score above 50%. At step 654a, for example, the snippet is translated assuming French as a source language and creating translations in output languages including Spanish, Chinese, Japanese, and others. Using translators to generate translations for different source and output languages can correspond to blocks 508-510.

At step 656, the resulting translations can be provided to translation score models 610. At step 658, the translation score models 610 can score each of the translations and determine a combined score for translations that have a common source language. In example 600, the translations with a source language of Italian received scores for output languages: Spanish of 1.12, Chinese of 1.32, Japanese of 0.87, English of 0.99, French of 1.21, and other scores. The combination of these scores for the Italian source language, for example, is 1.09. Determining scores and a combination scores for a source language can correspond to blocks 512 and 518.

At steps 660 and 662, the initial source language scores 606 and the combined translation scores 612 are provided to score updater 614. At step 664, score updater 614 can provide updated source language scores 616 by using the combined translation scores 612 as weighting factors for the top scoring initial source language scores 606. For example, Italian is determined to be the most likely source language based on the multiplication of its initial source language score 0.78 multiplied by its combined translation score 1.09. Updating the initial source language scores to determine updated source language confidence scores can correspond to block 412. In example 600, Italian can now be selected as the most likely source language for snippet 602 because it has the highest updated source language confidence score.

Several implementations of the disclosed technology are described above in reference to the figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C, etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method for identifying a most likely source language of a snippet, comprising:
   receiving an indication of the snippet, wherein the snippet is a digital representation of words or character groups;
   determining two or more possible source languages for the snippet;
   generating, by one or more machine translation engines, two or more translations of the snippet each having a specified translation source language,
      wherein at least one of the two or more translations of the snippet is generated having a first of the two or more possible source languages for the snippet set as the specified translation source language, and
      wherein at least another of the two or more translations of the snippet is generated having a second of the two or more possible source languages for the snippet other than the first of the two or more possible source languages for the snippet set as the specified translation source language;
   computing, by one or more translation score models trained using or more neural networks, accuracy scores for at least two of the generated two or more translations of the snippet;
   producing a confidence factor for each of at least two selected possible source languages for the snippet, wherein the confidence factor for each selected possible source language is produced based on one or more of the computed accuracy scores that has a source language corresponding to the selected possible source language; and
   selecting, as the most likely source language, the possible source language for the snippet that is associated with a highest confidence factor.

2. The method of claim 1,
   wherein the least one of the two or more translations of the snippet comprises multiple translations, each with a common specified translation source language;

wherein computing accuracy scores includes computing a combined accuracy score for the multiple translations, each with a common specified translation source language, wherein computing each combined accuracy score is performed by combining individual accuracy scores corresponding to each of the multiple translations that have a common specified translation source language; and wherein producing the confidence factor for the common specified translation source language is based on the combined accuracy score for the multiple translations each with that common specified translation source language.

3. The method of claim 2 further comprising:

performing an initial source language identification for the snippet;

wherein the initial source language identification for the snippet identifies one or more of the possible source languages each with a corresponding initial confidence value;

wherein each initial confidence value indicates, for a corresponding possible source language, a confidence that the corresponding possible source language is a language of the snippet; and wherein producing the confidence factor for at least a selected one of the possible source languages comprises updating the initial confidence value for the selected one of the possible source languages using the combined accuracy score corresponding to the selected one of the possible source languages.

4. The method of claim 2, wherein the confidence factor for the common specified translation source language is the combined accuracy score.

5. The method of claim 1 further comprising:

performing an initial source language identification for the snippet;

wherein the initial source language identification for the snippet identifies one or more of the possible source languages each with a corresponding initial confidence value; and wherein each initial confidence value indicates, for a corresponding possible source language, a confidence that the corresponding possible source language is a language of the snippet.

6. The method of claim 5, wherein the first of the two or more possible source languages is selected based on the corresponding initial confidence value for the first of the two or more possible source languages being above a threshold value.

7. The method of claim 5, wherein performing the initial source language identification for the snippet comprises an analysis of a context of the snippet.

8. The method of claim 7, wherein the analysis of the context of the snippet uses one or more of:

languages that an author of the snippet is known to be facile with;

languages associated with users identified as friends of the author of the snippet;

when the snippet was created;

information on the a virtual location where the snippet was posted; or any combination thereof.

9. The method of claim 1 further comprising:

selecting from the generated two or more translations of the snippet, as translations of the snippet, the translations where the specified translation source language is the language selected as the most likely source language of the snippet.

10. The method of claim 1, further comprising:

receiving an indication of a viewing user of the snippet; and determining an output language associated with the viewing user of the snippet;

wherein the generated two or more translations of the snippet are each in an output language matching the output language associated with the viewing user of the snippet.

11. The method of claim 1, wherein computing the accuracy scores is performed by a translation scoring model that is trained to generate translation scores with training data comprising data points each including an input snippet, an output snippet, and a score.

12. The method of claim 1, wherein the method is performed in response to a request that requires a translation of the snippet.

13. The method of claim 1, wherein the method is performed in response to creation of the snippet or posting of the snippet to a social media website.

14. A non-transitory computer-readable storage medium storing instructions that, when executed by a computing system, cause the computing system to perform operations for identifying confidence factors for snippet source languages, the operations comprising:

receiving an indication of a snippet, wherein the snippet is a digital representation of words or character groups;

receiving an indication of a viewer of the snippet;

determining an output language associated with the viewer of the snippet;

generating, by one or more machine translation engines, two or more translations of the snippet of the two or more translations each having a specified translation source language and each of the two or more translations being in an output language matching the output language associated with the viewer of the snippet, wherein at least one of the two or more translations of the snippet is generated having a first of two or more possible source languages for the snippet set as the specified translation source language, and wherein at least another of the two or more translations of the snippet is generated having a second of the two or more possible source languages for the snippet other than the first the two or more possible source languages for the snippet set as the specified translation source language;

computing, by one or more translation score models trained using or more neural networks, accuracy scores for at least two of the generated two or more translations of the snippet; and producing a confidence factor for each of at least two selected possible source languages for the snippet, wherein the confidence factor for each selected possible source language is produced based on one or more of the computed accuracy scores that has a source language corresponding to the selected possible source language.

15. The non-transitory computer-readable storage medium of claim 14, wherein the operations further comprise:

performing an initial source language identification for the snippet;

wherein the initial source language identification for the snippet identifies one or more of the possible source languages each with a corresponding initial confidence value; and wherein each initial confidence value indicates, for a corresponding possible source language, a confidence that the corresponding possible source language is a language of the snippet.

16. The non-transitory computer-readable storage medium of claim 15, wherein the first of the two or more possible source languages is selected based on the corresponding initial confidence value for the first of the two or more possible source languages being above a threshold value.

17. The non-transitory computer-readable storage medium of claim 14, wherein the operations further comprise:

selecting from the generated two or more translations of the snippet, as translations of the snippet, translations where the specified translation source language is a language with a highest confidence factor.

18. The non-transitory computer-readable storage medium of claim 14, wherein computing the accuracy scores is performed by a translation scoring model that is trained to generate translation scores with training data comprising data points each including an input snippet, an output snippet, and a score.

19. A system for generating a translation of a snippet, comprising:

a memory;

one or more processors;

an interface configured to receive an indication of the snippet, wherein the snippet is a digital representation of words or character groups;

a pre-translation language identifier configured to determine two or more possible source languages for the snippet;

a machine translation engine configured to generate two or more translations of the snippet, each of the two or more translations of the snippet having a specified translation source language, wherein at least one of the two or more translations of the snippet is generated having a first of the two or more possible source languages for the snippet set as the specified translation source language, and wherein at least another of the two or more translations of the snippet is generated having a second of the two or more possible source languages for the snippet other than the first the two or more possible source languages for the snippet as the specified translation source language;

a translation scoring model trained using one or more neural networks and configured to compute accuracy scores for at least two of the generated two or more translations of the snippet; and a confidence score generator configured to produce a confidence factor for each of at least two selected possible source languages for the snippet, wherein the confidence factor for each selected possible source language is produced based on one or more of the computed accuracy scores that has a source language corresponding to the selected possible source language;

wherein the interface is further configured to provide from the generated two or more translations of the snippet, as translations of the snippet, translations where the specified translation source language is the possible source language with the highest confidence factor.

20. The system of claim 19, wherein the pre-translation language identifier is configured to determine the two or more possible source languages for the snippet by:

performing an initial source language identification for the snippet;

wherein the initial source language identification for the snippet identifies one or more of the possible source languages each with a corresponding initial confidence value;

wherein each initial confidence value indicates, for a corresponding possible source language, a confidence that the corresponding possible source language is a language of the snippet; and wherein the first of the two or more possible source languages is selected based on the corresponding initial confidence value for the first of the two or more possible source languages being above a threshold value.

\* \* \* \* \*